Oct. 6, 1964     L. W. ATKIN ETAL     3,151,521
METHOD AND APPARATUS FOR PREVENTING OPTICAL
INTERFERENCE IN IMAGE REPRODUCING DEVICES
Filed June 3, 1960     2 Sheets-Sheet 1
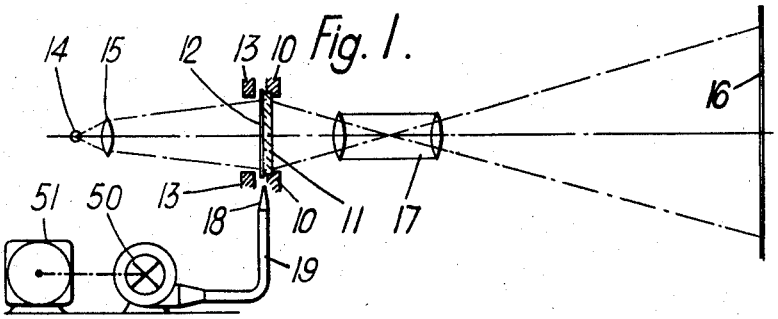
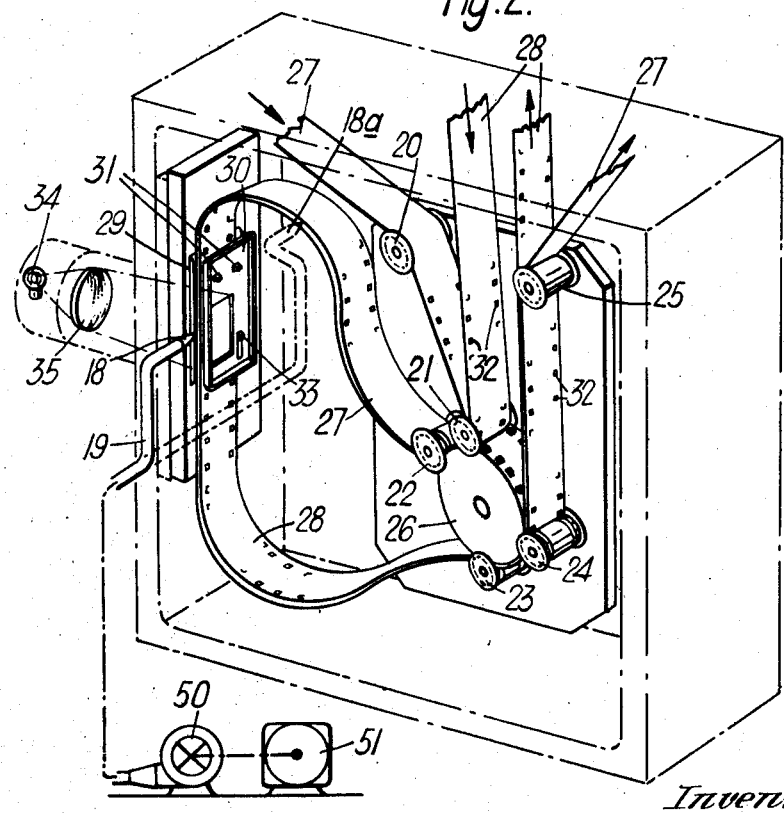
Inventors
Laurence Walter Atkin
John Henry Francis
Sidney Walter Wilson
By
Roberts, Cushman & Grover
Attorney Oct. 6, 1964 L. W. ATKIN ETAL 3,151,521
METHOD AND APPARATUS FOR PREVENTING OPTICAL
INTERFERENCE IN IMAGE REPRODUCING DEVICES
Filed June 3, 1960 2 Sheets-Sheet 2
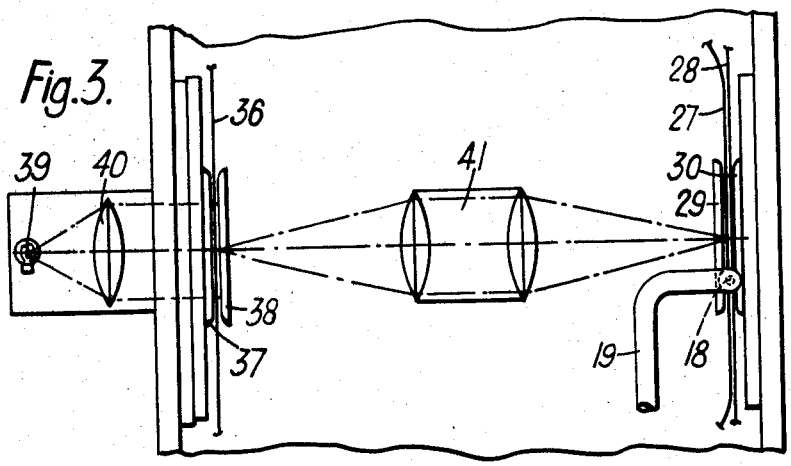
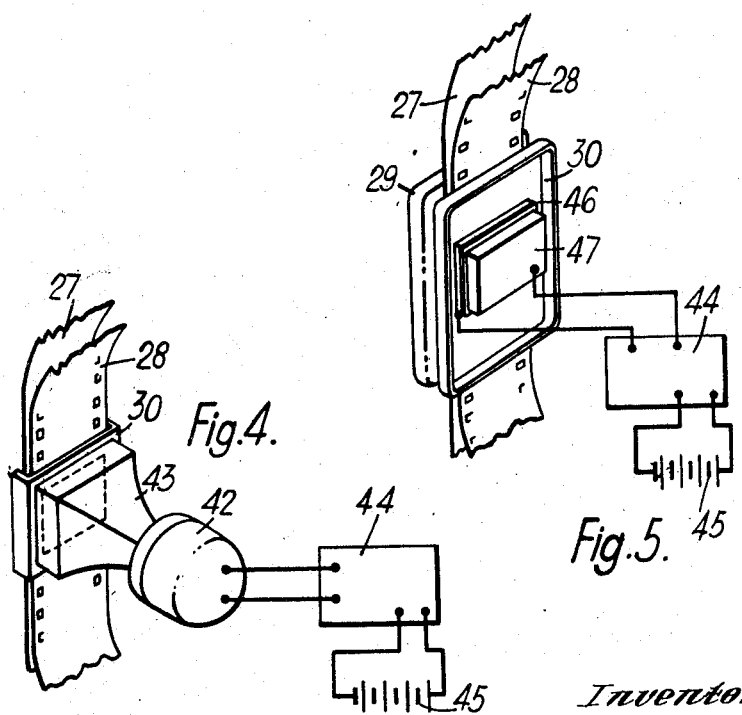
Inventors
Laurence Walter Atkin
John Henry Francis
Sidney Walter Wilson
By
Roberts, Cushman & Grover
Attorney United States Patent Office 3,151,521
Patented Oct. 6, 1964

3,151,521
METHOD AND APPARATUS FOR PREVENTING OPTICAL INTERFERENCE IN IMAGE REPRODUCING DEVICES
Laurence Walter Atkin, Staines, John Henry Francis, Heston, and Sydney Walter Wilson, Uxbridge, England, assignors to Technicolor Corporation of America, a corporation of Maine
Filed June 3, 1960, Ser. No. 33,850
Claims priority, application Great Britain June 9, 1959
15 Claims. (Cl. 88—24)

This invention relates to the reproduction of photographic or similar images. The invention, although not so restricted, is particularly applicable to the contact printing or optical projection printing of photographic films, such as cinematograph films, especially to the printing of photographic films in colour; and to the optical projection of photographic films, especially those in colour. In the contact printing of photographic films the negative film constituting the image-bearing base, is in close proximity to or in substantial contact with a positive film, constituting what will be referred to as a member and having substantial reflectivity and a refractive index substantially higher than that of air. In printing a film by optical projection, and in the optical projection of photographic films, the film, constituting the image-bearing base, is often in close proximity to or in substantial contact with a transparent member consisting, for example, of glass or other film that may or may not be image-bearing, having substantial reflectivity and having a refractive index substantially higher than that of air. In each case a film of air of indeterminate thickness is liable to intervene, locally or generally, between the base and the member. Thus optical interference may occur between, on the one hand, light emanating from or transmitted through the image-bearing base and passing directly through the member and, on the other hand, light emanating from or transmitted through the base, reflected at the surface of the member and re-reflected at the surface of the base; or between light passing directly through the member and through the base on the one hand, and, on the other hand, light reflected from the base and re-reflected by the member. Such reflection and re-reflection by the surfaces of the member and base occurs numerous times. Such multiple reflection and re-reflection, particularly when the light emanating from the image-bearing base, or part thereof, is mainly or wholly in a relatively narrow band of wavelengths within the visible spectrum, results in alternate dark and bright bands known as optical interference fringes. The principal object of the present invention is to reduce the production of optical interference fringes.

It is well known that changing the separation of the surfaces of base and member by one quarter of the wavelength in the intervening medium of the light passing between these surfaces results in a dark band being changed to a bright band and vice-versa. According to the present invention, in apparatus for reproduction of images borne in physical form upon a base, and comprising means for supporting the base in close proximity to or in contact with a member that is reflective or has a refractive index substantially different from that of such medium as may intervene between the base and the member, means are provided for imparting to one or to both of the base and the member vibration having at least a component perpendicular to the opposed surfaces of the base and the member. Thus the distance between these opposed surfaces is continually varied, and any dark or bright interference bands that might otherwise result from separation of the surfaces of the base and member are frequently interchanged with the result that over a period of time the average brightness is substantially unaffected by optical interference and interference bands are substantially wholly eliminated. The precise amplitude of vibration imparted to the base and member relatively to one another is in no sense critical but is preferably greater than one quarter of the wavelength of any light involved, and it may be as much as several, or many, wavelengths. For printing of positive photographic films from negative films and like photographic purposes, the frequency of relative vibration imparted to the negative and positive films need only be so high that a relatively small number of complete vibrations takes place during any individual printing exposure. For optical projection of images, however, the frequency of vibration is preferably substantially higher than that corresponding to persistence of vision. In either case, however, the frequency is preferably in the audible or ultra-sonic range of frequencies.

Various means may be employed for imparting relative vibration to the base and the member.

For example, a beam of air-waves, at audible or ultra-sonic frequency, may be caused to impinge upon either or both of the base and the member by means of an electro-acoustic transducer such as a telephone receiver, a magneto-strictive transducer or a piezo-electric transducer, in cases when either or both of the base and member have some flexibility. Thus a wafer of barium titanate may be mounted closely adjacent and parallel with the base or the member. Indeed, in some cases, for instance in optical projection of a photographic image, the member itself might have piezo-electric properties. Thus, the member may consist of barium titanate. In such cases an ordinary electrical oscillator might be employed to energize the transducer. In another arrangement, the base and the member are marginally enclosed so that they form walls of a chamber into which air pressure waves may be injected by a transducer. Again one or other of the base and the member may be enclosed by a chamber with a transparent wall to which air pressure waves are admitted. When either the base or the member is of a flexible nature, such as a cinematograph film, vibration may be applied to it at a point remote from an area of their proximity, such vibration being propagated along the base or member owing to its mass and stiffness.

In a preferred method of carrying out the invention a jet of air is directed at the edge of the base or the member preferably at the edge of the base or member when this is a cinematograph film, thus to cause it to vibrate. Such jet may be applied to a cinematograph film at a point somewhat remote from a printing or projection gate so that the induced vibration is propagated along the film.

Contact printing apparatus and optical printing or projection apparatus for cinematograph film involve guides over which the film or films run and registration means, such as pins, that enter the perforations of the films. Some degree of adhesion and friction between film and film in the case of contact printing apparatus, and between film or films and guides and registration means is liable to occur, detrimentally affecting proper and precise registration of the film or films; and in the case of the registration means considerable stress may be developed at the edges of the perforations, resulting in damage or undue wear. According to a feature of the present invention, in contact printing, optical printing or projection apparatus for cinematograph film, means are provided for imparting small amplitude vibration to the film or films in a direction transverse to the surface thereof in the region of guides or registration means. The vibration so imparted is preferably of ultrasonic frequency. It is found that the vibration so imparted reduces substantially friction and adhesion of a film to another film and to a guide and also facilitates and improves the engagement of registration means with the film perforations, thus improving registration and reducing wear and damage of the film. The vibration may conveniently be applied by any of the means previously referred to, but is preferably set up by means of an air jet impinging on the edge of the film or films adjacent any guide or registration means, such vibration being propagated along the film or films. Indeed one and the same vibration generating means may, in any cinematographic apparatus, frequently serve both the purpose of minimizing the formation of optical interference bands and of facilitating registration.

The invention thus comprises a method of palliating multiple reflections between a film surface and an adjacent reflecting surface and consequent optical interference, and of reducing friction and adhesion between the film and film guides and film advancing and film registration means, in the optical projection of or printing of cinematograph film, which method comprises imparting to the film small amplitude vibration in a direction tranverse to the surface of the film.

In the accompanying drawings:

FIG. 1 is a purley diagrammatic side view showing a simple optical projeciton system and demonstrating the invention in principle 2;

FIG. 2 is a diagrammatic perspective view of a cinematographic contact printing machine embodying the invention;

FIG. 3 is a fragmentary diagrammatic view showing a modification of the apparatus illustrated in FIG. 2 for printing cinematograph film by optical projection;

FIG. 4 is a fragmentary diagram showing an electro-acoustic transducers for applying the vibration; and FIG. 5 is a similar fragmentary diagram showing a piezo-electric device for applying the vibration.

Referring now to FIG. 1 of the drawings, the simple optical projection system here illustrated comprises a porjection gate or aperture having a frame including members 10 in which is supported a reflective transparent member 11 consisting of glass, for example. A translucent image-bearing base 12, which may be a cinematograph film or lantern slide, is maintained in substantial contact with the transparent member 11 by frame members 13, which may be and usually are resilient so as to urge the edges at least of the base 12 towards the transparent member 11. The image bearing base 12 is strongly illuminated by light from a source 14 by means of a condensing lens 15. An enlarged image of the image-bearing base 12 is projected upon a screen 16 by an objective lens 17. The arrangement described is elementary and conventional.

Inevitably a film of, in ordinary circumstances, air will exist between at least parts of the proximate surfaces of the image-bearing base 12 and transparent member 11. The latter has substantial reflectivity and a refractive index higher than that of air. Thus part of the light from the source 14 and condenser 15 traversing the image-bearing base 12 passes through the member 11 but part is reflected therefrom and reflected from the surface of image-bearing base 12, such reflection and re-reflection causing optical interference.

In this embodiment of the invention, vibration in a direction perpendicular to the opposed surfaces of the base 12 and member 11 is imparted to the former by a jet of air directed at the edge of the image-bearing base 12 from a nozzle 18 to which air under pressure is supplied by a pipe 19 from a compressor or pump 50 driven by an electric motor or other source of power 51. Thus, the distance between the opposed surfaces of the image-bearing base 12 and member 11 is continually varied, and any bright or dark interference bands that might otherwise result from the separation of the surfaces of the image-bearing base 12 and member 11 and be superimposed on the picture on the screen 16, are frequently interchanged, with the result that over a period of time, the average brightness is substantially unaffected by optical interference and interference bands are substantially wholly eliminated.

Referring now to FIG. 2 of the accompanying drawings, the cinematographic contact printing apparatus diagrammatically shown, comprises the conventional guide rollers 20, 21 and 22, feed sprocket 26 and guide rollers 23, 24 and 25, by which a negative cinematograph film 27 constituting the image-bearing base, previously referred to, are advanced together and in contact with one another to and withdrawn from a printing gate. The printing gate comprises conventional apertured leaves 29 and 30 which are resiliently urged towards one another so as to retain the films 27 and 28 in close proximity to one another. The printing gate mechanism also comprises register pins 31 which engage perforations 32 of the two films, when stationary, and film advancing claws 33 that advance the two films 27 and 28 step by step. The sprocket 26 is rotated at an appropriate speed by conventional means not shown. The register pins 31 are periodically retracted from engagement with the perforations 32 by conventional mechanism in synchronism with the rotation of the sprocket 26. Also the film advancing claws 33 are inserted into the perforations 32 of the films and are engaged with the perforations 32 and moved downwardly to advance the films in the gate while the register pins 31 are disengaged from the perforations by conventional mechanism synchronized with the sprocket 26, by conventional mechanism. Usually this mechanism involves means for separating the leaves 29 and 30 of the gate, to permit the films to escape from the register pins 31 during the engagement and movement of the film advancing claws 33. All this mechanism is conventional and further detail description and illustration of it is unnecessary.

Light for exposing the positive film 28 through the negative film 27 is furnished by a conventional illuminating system such as the lamp 34 and condensing lens 35.

In the form of apparatus illustrated in FIG. 2, as in that illustrated in FIG. 1, a jet of air may be directed by a jet 18 against the edges of the two films 27 and 28 so that vibration is imparted to at least one of them where they are juxtaposed in the printing gate. The jet 18 is supplied with air under pressure by a pipe 19 from an air compressor or pump 50 driven by an electric motor 51. Thus, the distance between the opposed surfaces of the image-bearing base constituted by the film 27 and the reflective member constituted by the film 28 is continually varied and of average brightness at any point on the positive film 28 is substantially unaffected by optical interference. Moreover, the adhesion and friction between the films 27 and 28 and the leaves 29 and 30 of the printing gate and between the films 27 and 28 and the register pins 31 and claws 33 is substantially reduced. Also the engagement of the register pins 31 and claws 33 with the perforations 32 of the films is facilitated, thus improving registration and reducing wear and damage of the films.

It has been found in practice, however, that it is not essential that the relative vibration should be applied to the films 27 and 28 at the actual printing gate. Indeed, the film or films may be excited into vibration at a point that is some distance from that at which it is required to be effective, the vibration being propagated as waves along the film or films by virtue of their mass and elasticity. Accordingly, as shown in FIG. 2, the film or films may be excited into vibration by means such as a jet of air from a nozzle 18a directed at the edges of the films in one of the loops between the printing gate and the sprocket 26. If desired, the vibration may be excited at more than one point in the run of the film, for example, by both jets from both of the nozzles 18 and 18a.

Referring now to FIG. 3 of the drawings, it is often desired to print simultaneously on to one positive film two negative films to produce composite images on the positive film. For this purpose a different optical arrangement is substituted in the arrangement described with reference to and shown in FIG. 2 for the light source 34 and lens 35 a projection system for optically projecting on to the films 27 and 28 between the gate leaves 29 and 30 an image of another negative film 36. For this purpose the negative film 36 runs in an additional film gate comprising leaves 37 and 38, being advanced therethrough and registered therein by conventional mechanism, not shown, similar to and synchronized with the sprocket 26, registration pins 31 and advancing claws 33 of FIG. 2. The area of the negative film 36 within the gate is illuminated by means of a light source 39 and condensing lens 40, and an image of the film 36 is focussed on the films 27 and 28 by means of an objective lens 41. Again, according to the invention, a nozzle 18, as in FIG. 2, and air supply pipe 19 project compressed air upon the edges of the films 27 and 28. If desired, however, the nozzle may be arranged clear of the gate as shown at 18a in FIG. 2.

Although it is preferred to impart the necessary vibrating by means of a jet of air directed against the edge of the film as shown in FIGS. 1, 2 and 3, other devices may be employed, particularly in printing as opposed to projection systems. For example, as shown diagrammatically in FIG. 4, an electromagnetic sound transducer 42, such as an ordinary loud-speaker telephone movement may be coupled by a horn or flare 43 to the rear of the gate leaf 30 of the printing gate through which the negative film 27 and the positive film 28 run. The transducer 42 may be energized by an audio-frequency or supersonic frequency oscillator 44 supplied by an electrical source 45. Again, as shown diagrammatically in FIG. 5, the transducer may comprise a piezoelectric crystal 46, a wafer of barium titanate for example, abutted against an aperture in the gate leaf 30. A massive backing or reaction plate 47 may be provided and may serve as one of electrical contacts of the crystal. The piezo-electric crystal may be set into vibration by an electrical audio-frequency or supersonic oscillator 44 energized by an electrical source 45. In either case air waves propagated by the transducer impinge upon the surface of the film 28 and set the latter into vibration. The vibration so set up not only minimizes optical interference but also minimizes adhesion and friction between the films and the gate leaves and the film-advancing claws and registration means, which, although not shown in FIGS. 4 and 5 are, of course, present.

It will be appreciated that certain particular manners of putting the invention into practice have been described in some detail with reference to and have been diagrammatically illustrated in the accompanying drawings, the invention is not limited thereto, since many modifications are practicable.

What we claim is:

1. The method of preventing optical interference in image reproducing apparatus between an image carrying base and a somewhat reflective member with which the base is associated comprising introducing relative vibration between the base and the member in a direction perpendicular to the opposed surfaces of the base and the member.

2. The method of preventing optical interference in image reproducing apparatus between a flexible image carrying base and a somewhat reflective member with which the base is associated, comprising holding the base in movable relation to the member, and introducing relative vibration between the base and the member in a direction perpendicular to the opposed surfaces of the base and members.

3. In combination with image reproducing apparatus in which a film base is supported in close proximity to a partially reflective member the improvement comprising means for introducing relative vibration between the film base and said member in a direction perpendicular to the opposed surfaces of the base and the member.

4. Apparatus according to claim 3 in which said means is located adjacent said member.

5. Apparatus according to claim 4 in which said means is an air jet directed at the edge of said base.

6. Apparatus according to claim 3 in which said means applies vibration to the film base at a point spaced from said member, the vibration being transmitted by the film base to the vicinity of said member.

7. Apparatus according to claim 6 in which said means is an air jet directed at the edge of said base.

8. Apparatus according to claim 3 in which said means is an electro-acoustic transducer for impinging a beam of air waves upon said base.

9. Apparatus according to claim 3 in which said means is an electro-mechanical transducer for vibrating said base by direct contact.

10. Apparatus according to claim 3 in which said means is an electro-mechanical transducer for vibrating said member.

11. Apparatus for the reproduction of images borne in physical form upon a base comprising a transparent member for supporting the base, means for holding the base in close proximity to said member, and means for introducing relative vibration between the base and said member in a direction perpendicular to the plane of the base.

12. Apparatus for the projection of images borne in physical form upon a base comprising: a transparent member for supporting the base, said transparent member inherently reflecting a portion of light; means for holding the base in close proximity to said member; a lens for forming a light image of the physical image; and means for introducing relative vibration between the base and said member in a direction perpendicular to the opposed surfaces of the base and said member to prevent optical interference fringes, the amplitude of the vibration being greater than the quarter wave lengths of visible light and smaller than the depth of focus of said lens.

13. Apparatus according to claim 12 wherein the frequency of said vibration is substantially higher than that corresponding to persistence of vision.

14. Apparatus for contact printing photographic film comprising means for supporting an image bearing film in close proximity to a film to be printed and means for introducing relative vibration between the films in a direction perpendicular to the opposed surfaces of the films.

15. Apparatus for reproducing an image on a flexible film strip comprising a film gate including a somewhat reflective member, means to move the film into loose, opposed surface to surface relation with said member with the edges of said film unobstructed, and means for introducing relative vibration between the film base and said member in a direction perpendicular to the base and member.

References Cited in the file of this patent

UNITED STATES PATENTS

| 2,315,914 | Wengel | Apr. 6, 1943 |
| 2,443,171 | Tuttle | June 8, 1948 |
| 2,691,320 | Borberg | Oct. 12, 1954 |
| 2,849,915 | Kennedy | Sept. 2, 1958 |

OTHER REFERENCES

An article "Air Cooling of Motion Picture Film for Higher Screen Illumination" and an illustration in the "Journal of the SMPE," vol. 53, December 1949. (Discussion presented Apr. 8, 1949, by F. T. Kolb of Eastman Kodak, Rochester.) Pages 650, 658 relevant.